(12) United States Patent
Bergstein et al.

(10) Patent No.: US 6,633,433 B2
(45) Date of Patent: Oct. 14, 2003

(54) BEAM SHAPING FOR OPTICAL SCANNERS

(75) Inventors: Leonard Bergstein, Teaneck, NJ (US); Emanuel Marom, Tel Aviv (IL); Yajun Li, Oakdale, NY (US); Joseph Katz, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 09/867,399

(22) Filed: May 31, 2001

(65) Prior Publication Data

US 2002/0036258 A1 Mar. 28, 2002

Related U.S. Application Data

(63) Continuation-in-part of application No. 09/714,511, filed on Nov. 17, 2000, which is a continuation-in-part of application No. 09/330,053, filed on Jun. 11, 1999, now abandoned.

(51) Int. Cl.$^7$ .............................. G02B 27/42; G06K 7/10
(52) U.S. Cl. .................. 359/569; 359/558; 359/641; 359/900; 235/454; 235/462.01; 235/462.22
(58) Field of Search ............................ 359/558, 9, 15, 359/566, 569, 641, 900; 235/454, 462.01, 462.22

(56) References Cited

U.S. PATENT DOCUMENTS

| | | | |
|---|---|---|---|
| 4,887,885 A | 12/1989 | Durnin et al. | |
| 5,056,881 A | 10/1991 | Bowen et al. | |
| 5,080,456 A | 1/1992 | Katz et al. | |
| 5,111,312 A | 5/1992 | Stewart | |
| 5,164,584 A | 11/1992 | Wike, Jr. et al. | |
| 5,231,624 A | * 7/1993 | Finegan | 369/116 |
| 5,245,619 A | 9/1993 | Kronberg | |
| 5,278,679 A | 1/1994 | Davis et al. | |
| 5,315,095 A | 5/1994 | Marom et al. | |
| 5,331,143 A | 7/1994 | Marom et al. | |
| 5,336,875 A | 8/1994 | Ono et al. | |
| 5,349,592 A | 9/1994 | Ando | |
| 5,475,208 A | 12/1995 | Marom | |
| 5,477,554 A | 12/1995 | Yoshii et al. | |
| 5,496,995 A | 3/1996 | Kato et al. | |
| 5,524,018 A | 6/1996 | Adachi | |
| 5,559,724 A | 9/1996 | Morrison | |
| 5,633,735 A | 5/1997 | Hunter, Jr. et al. | |
| 5,648,649 A | 7/1997 | Bridgelall et al. | |
| 5,673,136 A | 9/1997 | Inoue et al. | |
| 5,675,401 A | 10/1997 | Wangler et al. | |
| 5,734,152 A | 3/1998 | Goren et al. | |
| 5,932,860 A | 8/1999 | Plesko | |
| 6,016,223 A | 1/2000 | Suzuki et al. | |
| 6,092,728 A | 7/2000 | Li et al. | |
| 6,128,134 A | * 10/2000 | Feldman et al. | 359/565 |
| 6,188,500 B1 | 2/2001 | Rudeen et al. | |

FOREIGN PATENT DOCUMENTS

| | | |
|---|---|---|
| GB | 2256298 | 12/1992 |
| JP | 10-227992 | 8/1998 |
| RU | 1620974 | 1/1991 |
| RU | 1753446 | 8/1992 |

OTHER PUBLICATIONS

Jari Turunen, et al., "Holographic generation of diffraction–free beams", Applied Optics, vol. 27, No. 19, pp. 3959–3962. 1.*

J. Durnin, "Exact Solutions for Nondiffracting Beams I. The Scalar Theory", 1987 Optical Society of America, vol. 4, No. 4, pp. 651–654.

(List continued on next page.)

*Primary Examiner*—John Juba
(74) *Attorney, Agent, or Firm*—Kirschstein, et al.

(57) ABSTRACT

A beam generator, or beam shaping system, for example for use in an optical scanner, creates a non-Gaussian beam which provides improved indicia-reading characteristics. In one embodiment, diffractive optical elements are used to create a Bessel-Gaussian scanning beam, which comprises a coherent combination of a Gaussian beam and a Bessel beam.

13 Claims, 13 Drawing Sheets

OTHER PUBLICATIONS

J. Durnin et al., "Diffraction–Free Beams", 1987 The American Physical Society, vol. 58, No. 15, pp. 1499–1501.

"A Practical Algorithm for the Determination of Phase from Image and Diffraction Plane Pictures", 1972 Optik, vol. 35, No. 2, pp. 237–250.

Anita Vasara et al., "Realization of General Non–Diffracting Beams with Computer–Generated Holograms", J. Opt. Soc. Am. vol. 6, No. 11, pp. 1748–1754.

E. Marom et al., "Scanning with Axicon–Generated Beams", 1992 Optical Society of America Annual Meeting, Sep. 20–25, 1992, Albuquerque, New Mexico, Technical Digest Series, vol. 23.

Staronski et al., "Design of Uniform–Intensity Refractive Axicons", Optical Engineering, vol. 31, pp. 516–521.

J. Indebetouw, "Nondiffracting Optical Fields: Some Remarks on Their Analysis and Synthesis," J. Opt. Soc. Am. A6, 150–152 (1989).

R.M. Herman et al., "Production and Uses of Diffractionless Beams," J. Opt. Soc. Am. A8, 932–042 (1991).

G. Scott et al., "Efficient Generation of Nearly Diffraction–Free Beams Using an Axicon," Opt. Eng. 12, 2640–2646 (1992).

L. C. Laycock and S.C. Webster, "Bessel beams: Their Generation and Application, "GEC J. Res. 10, 36–51 (1992).

F. Gori et al., "Bessel–Gauss Beams," Opt. Commun. 64, 491–495 (1987).

C. Palma et al., "Imaging of Generalized Bessel–Gauss Beams," J. Mod. Opt. 43, 2269–2277 (1992).

R. Piestun et al, "Generalized Propagation–Invariant Wave Fields," J. Opt. Soc. Am. A 15, 3039–3044 (1998).

P.L. Overfelt et al., "Comparison of Propagation Characteristics of Bessel, Bessel–Gaussian, and Gaussian Beams Diffracted by a Circular Aperture," J. Opt. Soc. A8, 732–745 (1991).

C.F. Du Toit, "The Numerical Computation of Bessel Functions of the First and Second Kind for Integer Orders and Complex Arguments" IEEE Trans. Antennas Propag. 38, 1341–1349 (1990).

Y. Li et al., "Encircled Energy of Laser–Diode Beams," Appl. Opt. 30, 4283–4284 (1991).

Y. Li et al., "Nonparaxial Analysis of the Far–field Radiation Patterns of Double–Heterostructure Lasers," Appl. Opt. 35, 1442–1451 (1996).

* cited by examiner

| i | Di |
|---|---|
| 1 | 0.24 |
| 2 | 0.55 |
| 3 | 0.87 |
| 4 | 1.18 |
| 5 | 1.49 |
| 6 | 1.81 |
| 7 | 2.12 |
| 8 | 2.44 |
| 9 | 2.75 |
| 10 | 3.06 |
| 11 | 3.38 |
| 12 | 3.69 |
| 13 | 4.01 |
| 14 | 4.32 |
| 15 | 4.63 |
| 16 | 4.95 |

*FIG. 5*

BEAM SHAPING FOR OPTICAL SCANNERS

This disclosure claims priority under 35 U.S.C. §120 of continuation-in-part application No. 09/330,053, filed on Jun. 11, 1999, now abandoned and which is a continuation-in-part of Ser. No. 09/714,511, filed on Nov. 17, 2000, (allowed) the disclosures of which are hereby incorporated by reference in their entireties.

BACKGROUND OF THE INVENTION

1. Field of the Invention

The present invention relates generally to a method of and apparatus for shaping a light beam within an optical scanning system. More specifically, the invention relates to the shaping of a laser beam into a non-Gaussian configuration. The invention further extends to an indicia or bar code reader incorporating such apparatus.

2. Description of the Related Art

Optical scanners, such as bar code symbol readers, are now quite common. Typically, a bar code symbol comprises one or more rows of light and dark regions, typically in the form of rectangles. The widths of the dark regions (bars) and/or the widths of the light regions (spaces) between the bars represent encoded information. A bar code symbol reader typically illuminates the symbol with a scanning laser beam, and the widths of the bars and/or spaces are deduced from the reflected light. This data can then be used to decode the bar code symbol and to recover the underlying high-level information which it represents.

The ease with which the bars and spaces can be distinguished, and their widths determined, depends upon very many factors, an important one of which is the characteristics of the laser beam "spot" which is formed when the laser beam falls onto the symbol. Since the symbol is generally scanned in a direction perpendicular to the beam axis, the beam "spot" corresponds with the beam cross-section at that particular point. With the use of conventional shaping optics the power density in the beam cross-section is generally Gaussian in form, although possibly with a different spread in the x-direction (the direction of scanning) and in the y-direction(perpendicular to the direction of scanning). Where the x and y spreads are not the same, the beam has an elongated or quasi-eliptical cross-section.

One of the requirements, for effective scanning is an adequate working range, in other words the range of distances from the scanner that the bar code symbol may be placed and still be decoded. It is typically only over a limited working range that the cross-section of the beam takes up an appropriate generally elongated shape to allow reliable decoding. This is particularly evident where the beam is provided by means of a laser diode, since these exhibit substantial astigmatism. Typically, the application of shaping optics applied to such a beam creates a scanning beam in which the cross-section varies with distance from the scanner. The point at which the x-dimension of the beam cross-section is narrowest (the "x-waist") may be at a different distance from that at which the y dimension is narrowest (the "y-waist").

It is well known that Gaussian beams, when used for scanning a target, provide a signal with excellent contrast. However, Gaussian beams suffer from limited working ranges, and the smaller the waists are designed to be the shorter the working ranges become. Since the working ranges are effectively those where the beam cross-sections remain essentially constant, these correspond generally with the Rayleigh ranges.

An alternative approach is to use the beam-shaping devices known as axicons: see U.S. Pat. Nos. 5,331,143 and 5,164,584, both commonly assigned with the present application. A related approach is disclosed in U.S. Pat. No. 5,315,095. Further theoretical and practical background information may be found in the following papers: J. E Dumin, "Exact solution for non-diffracting beams. I. The scalar theory," JOSA A4, 651–654 (1987); J E Dumin, J J Meceli and J H Eberly, "Diffraction-free beam," *Phys. Rev. Lett.* 54, 1499–1501 (1987); and E Marom and J Katz, "Scanning with axicon-generated beams," OSA 1992 Annual Meeting, New Mexico, WW4.

SUMMARY OF THE INVENTION

Objects of the Invention

It is one object of the present invention to provide a simple, relatively inexpensive, means of creating a non-Gaussian beam, for example a laser beam to be used in an optical scanner.

It is a further object to provide a beam generator, or beam shaping system, and an optical scanner, in which some of the difficulties associated with the use of Gaussian beams are eliminated or alleviated.

It is a further object of the present invention to provide a means of increasing the working range of an optical scanner. A related object is to provide a convenient means of controlling the working range of the beam.

FEATURES OF THE INVENTION

According to the present invention there is provided a beam generator, or beam shaping system, comprising a laser for producing an initial laser beam, a beam shaping element for shaping the initial laser beam, and a phase filter for altering the wavefront of the shaped beam to create a non-Gaussian outgoing beam. The invention also extends to an optical scanner, for example a hand-held or portable bar code scanner, incorporating a beam generator of this type.

Preferably, the beam shaping element may comprise a diffractive optical element, a holographic optical element, or an anamorphic lens. The phase filter may also comprise a diffractive optical element or a holographic optical element. The filter preferably takes the form of a Bessel filter (i.e. a filter that converts an incoming plane wave to an outgoing wave having a power density that varies as the Bessel function $J_0$). The filter may for example comprise a plurality of concentric rings. The phase filter could either comprise a phase-only filter, or alternatively a combined phase and amplitude filter. The phase filter could also comprise an etched substrate.

In the preferred embodiment, the outgoing beam has a power density which comprises a Bessel-Gaussian beam, or a coherent combination of a Bessel beam and a Gaussian beam, which does not vary exclusively according to the Bessel Function $J_0$.

In a preferred embodiment an anisotropic beam is synthesized using a phase-only filter illuminated by a collimated laser diode beam. When using a laser diode as a source, the beam leaves the collimation optics as a Gaussian beam. It then passes through an aperture to produce a truncated Gaussian beam. The truncated Gaussian beam is filtered through a Bessel filter to reduce the edge effects introduced by the aperture. The beam waist of the truncated Gaussian beam is matched to the size of the center circle of the Bessel filter, thereby allowing a high percentage of the beam's power to be transmitted through the center circle of the phase filter while rendering negligible any edge effects or high spatial frequency noise, such as rippling or the like, introduced by the truncation of the beam by the aperture.

Extended confinement range is obtained at the expense of reduced contrast for a wide range of spatial frequencies. Substantial improvements in the range of the beam can be achieved depending on the optimized spatial frequency and the desired contrast level.

The present invention, in one or more of its various forms, supplies a number of distinct advantages over the conventional axicons used in the prior art. More specifically, the tilt angle may be almost twice as large as that for a conventional axicon. In addition, the longer spacing between the collimation lens and the phase grating than that used for a conventional axicon avoids the boundary-diffraction/irregular-reflection from the rim of the aperture. In the preferred embodiment, the use of a phase grating allows the zero-order mode to propagate together with the first-order mode; these are equivalent, respectively, to a Bessel-type of non-diffracting beam and a truncated Gaussian type diffracting beam. The non-diffracting beam has an extended working range of higher density bar code symbols, whereas the diffracting beam response deals with lower density symbols for distant decoding. Accordingly, the outgoing beam may comprise a coherent combination of a diffracting beam and a non-diffracting beam.

The preferred phase grating has a grating constant of 40 micrometers. The zero-order is strong, with measurements showing that between 30% and 40% of the total optical power goes into the zero order.

The coherent combination of two beams, described in the various embodiments of the present invention, allow the user to make use of the beams different propagation properties in a very simple and convenient way, for example for bar code data capture.

The novel features which are considered characteristic of the invention are set forth in particular in the appended claims. The invention itself, however, both as to its construction and its method of operation, together with additional objects and advantages thereof, will best be understood from the following description of specific embodiments when read in connection with the accompanying drawings.

BRIEF DESCRIPTION OF THE DRAWINGS

FIG. 5 gives the dimensions of the phase mask of FIG. 4;

DETAILED DESCRIPTION OF THE PREFERRED EMBODIMENTS

Figure 1:
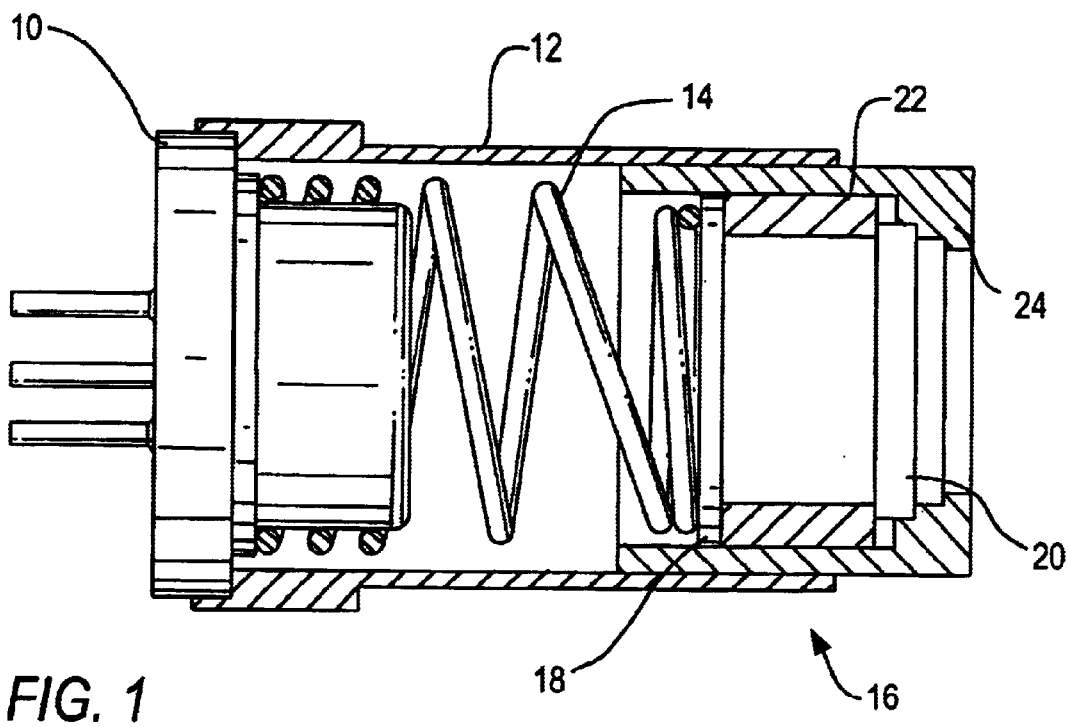
FIG. 1 is a cross-section through a first embodiment of a Bessel beam generator according to the present invention.

FIG. 1 shows a beam generator module, preferably for use in an optical scanner, according to a first embodiment of the present invention. The module includes a Visible Laser Diode (VLD) 10, held within a generally cylindrical laser holder 12. In the far end of the laser holder, spaced apart from the laser by a compression spring 14, is a Bessel beam generator assembly generally indicated at 16. This comprises an anamorphic element 18 and a phase mask 20, mutually spaced by means of a generally cylindrical spacer 22. Both the anamorphic element and the phase mask are preferably Diffractive Optical Elements (DOEs). The anamorphic element, the phase mask and the spacer are held in position within the laser holder 12 by means of a DOE holder 24.

In operation, the outgoing light beam (not shown) from the VLD is first shaped by the anamorphic element 18, and then converted into a Bessel beam by the phase mask 20, this phase mask taking the form of a Bessel filter.

Figure 2:
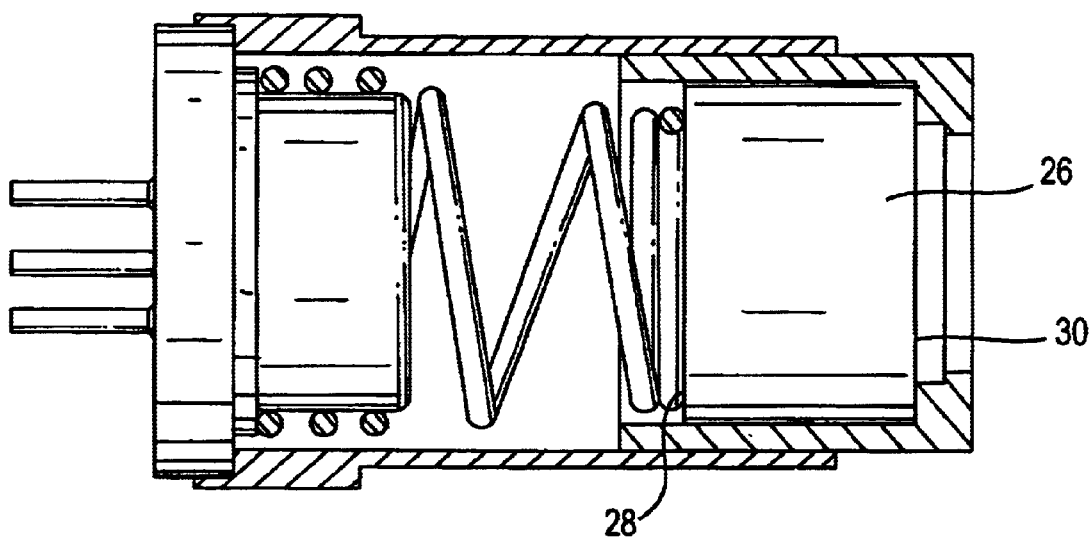
FIG. 2 is a cross-section of an alternative arrangement.

In an alternative arrangement, shown in FIG. 2, the separate anamorphic element 18 and phase mask 20 may be combined into an integrated optical element 26. This is preferably an integrated diffractive optical element, having an anamorphic surface 28 and a phase mask surface 30. As the beam passes through the anamorphic surface it is shaped, and as it passes through the phase mask surface (a Bessel filter) it is converted into a Bessel beam.

The diffractive optical elements 18,20,26 of FIGS. 1 and 2 may be made of any convenient plastics material, such as acrylic.

Figure 3:
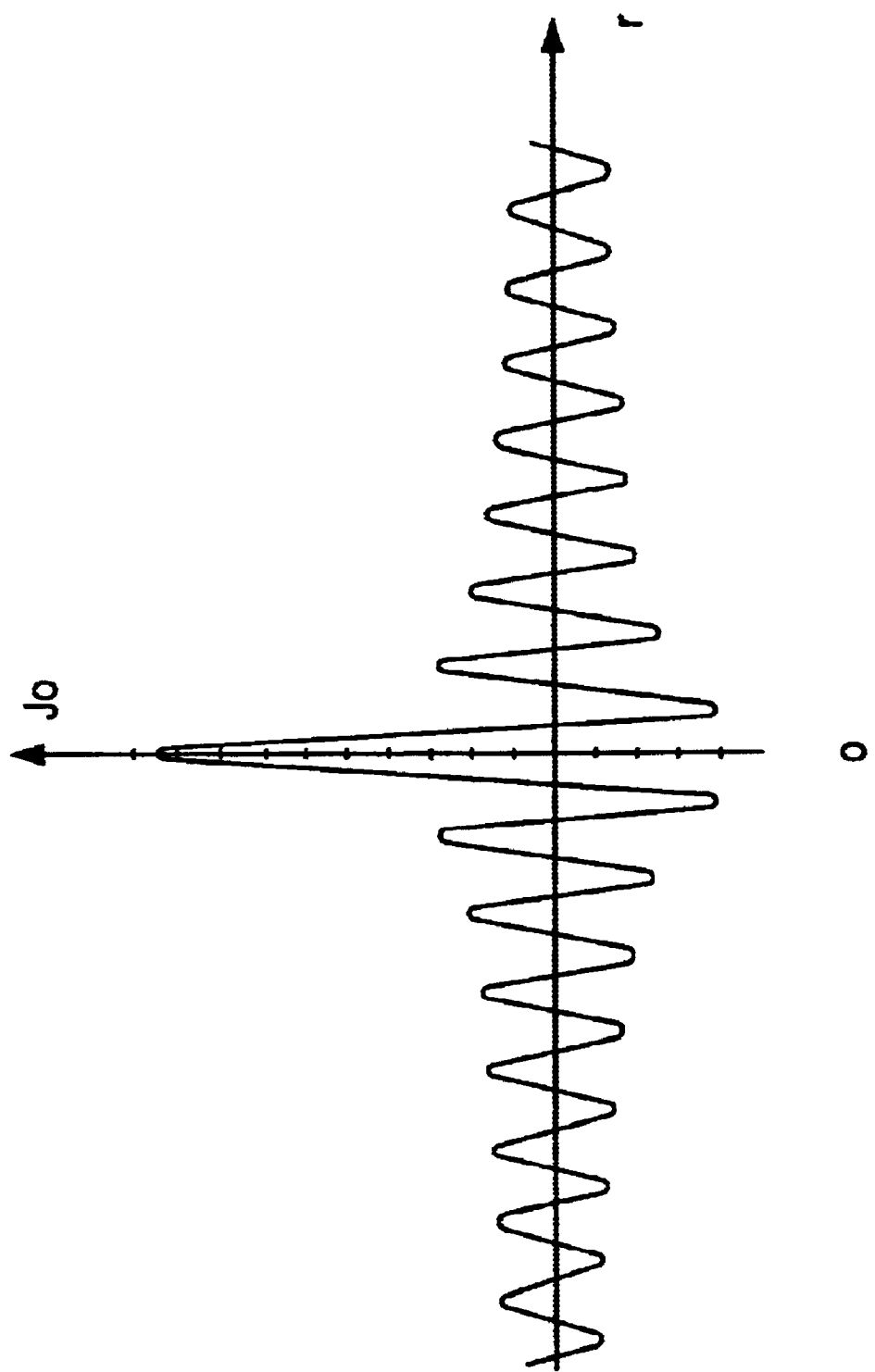
FIG. 3 shows the Bessel beam function generated by the embodiments of FIGS. 1 and 2.

FIG. 3 shows the amplitude variations of the outgoing laser beam as it leaves the diffractive optical element 20 of FIG. 1, or the corresponding element 26 of FIG. 2. The graph of FIG. 3 shows how the beam amplitude varies according to distance r from the beam axis 0. As will be seen, the amplitude variation of the outgoing laser beam follows the envelope of the Bessel function $J_0$.

Figure 4:
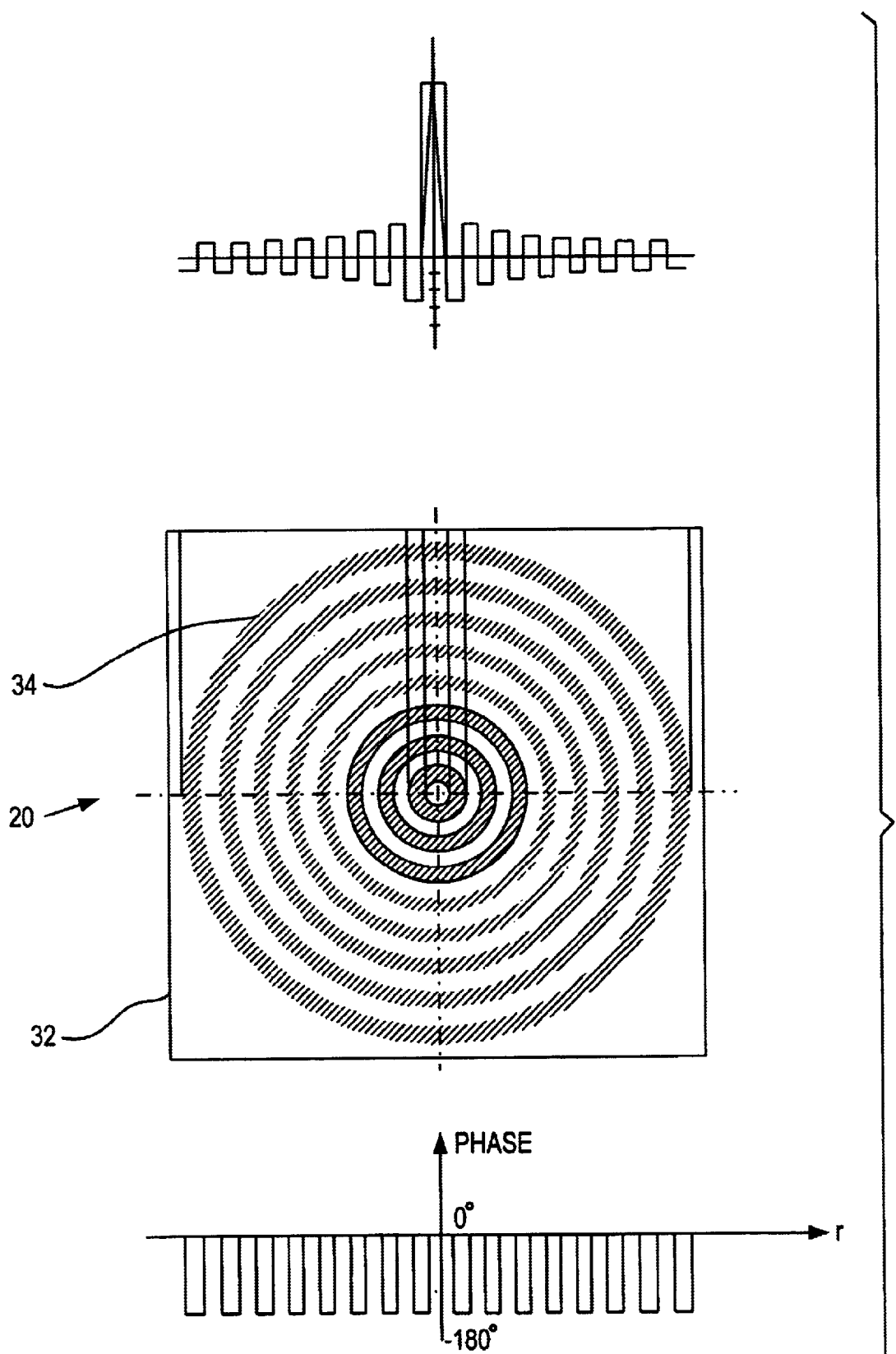
FIG. 4 shows details of the phase mask used in the embodiments of FIGS. 1 and 2.

Details of the phase mask 20 of FIG. 1 are shown in FIG. 4. The details would be similar for the phase mask surface 30 of the element 26 of FIG. 2.

The phase mask 20 comprises a square plastics material base, of about 6 mm on each side, having on its surface a Bessel filter 34 consisting of sixteen concentric rings. As illustrated at the bottom of FIG. 4, the space difference between adjacent rings is 180°.

The table in FIG. 5 sets out the preferred ring diameters $D_i$ for each of the sixteen rings i. All of the measurements are in millimeters.

In a practical embodiment, the Visible Laser Diode may be of any convenient type such as the Sony laser SLD 1133VS. Typically, the laser beam cross-section from such a laser diode is elongate (quasi-eliptical). As the beam passes through the anamorphic element 18 (FIG. 1) or the anamorphic surface 28 (FIG. 2) it is transformed into an axially-symmetric beam. The exact design of the anamorphic element is a matter of conventional design for a skilled man in the art, and will be chosen according to the particular characteristics of the visual laser diode that is to be used. The anamorphic element may, for example, act in the same way as a cylindrical lens. Indeed, in a variation (not shown) of either of the embodiments so far described, the anamorphic element may actually be a lens, preferably a cylindrical lens.

Figure 6:
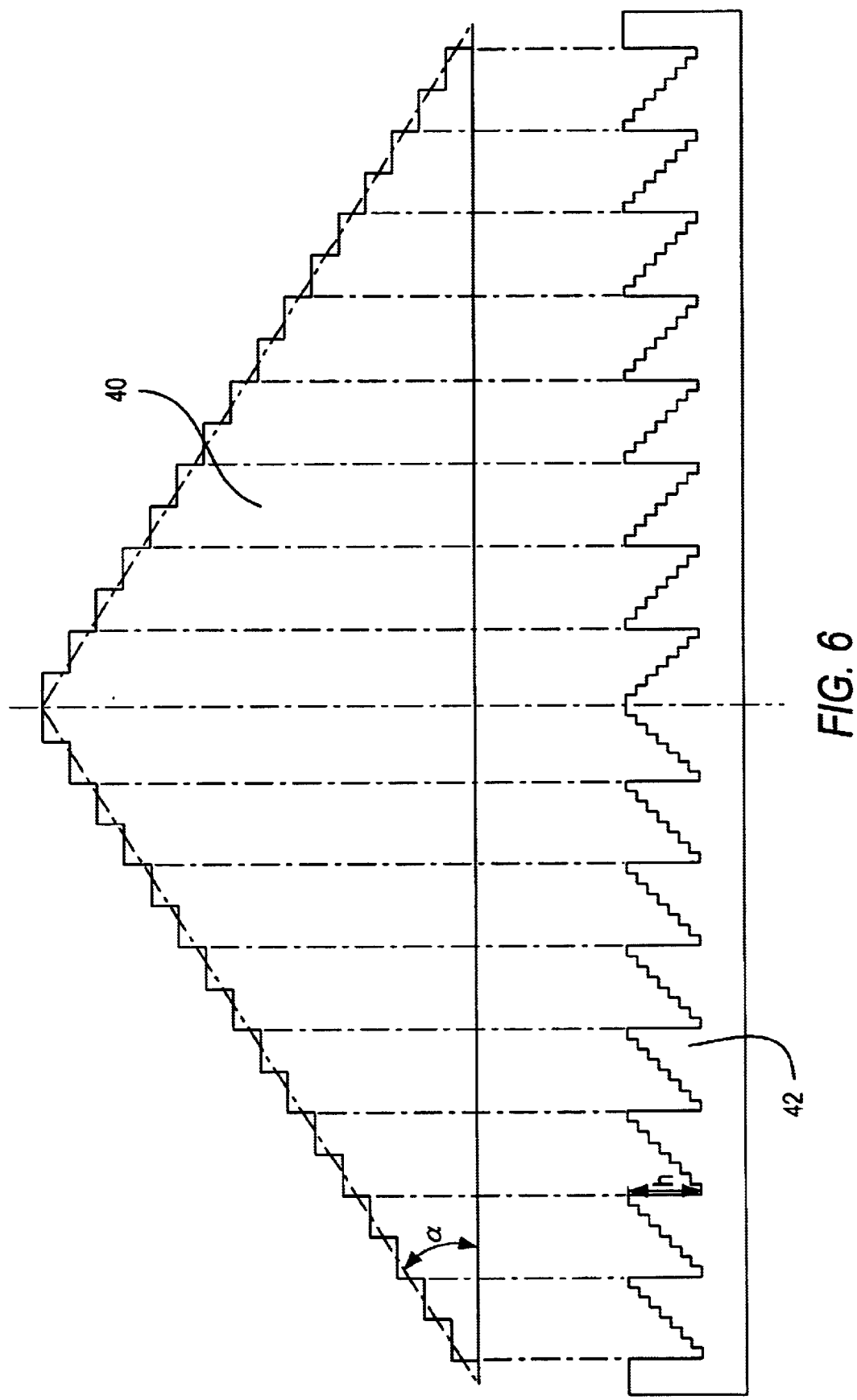
FIG. 6 shows various options for the phase mask.

In the preferred practical embodiment the phase mask may take either of the forms shown in FIG. 6. As shown in the upper diagram of FIG. 6, the phase mask takes the form of a stepped pyramid or axicon 40 which can be fabricated in a wide range of materials including silica, plastic and silicon. This is preferably fabricated on a fused silicon wafer of refractive index 1.455. The axicon angle $\alpha$ is 0.273°, which is optimized for a laser wavelength of $0.67 \times 10^{-3}$ mm. The overall axicon diameter is 4.95 mm.

In an alternative embodiment, shown at the bottom of FIG. 6, the phase mask takes the form of a multi-level DOE 42, again manufactured using fused silica. Here, the height h of each of the ramps is chosen to be equal to the laser wavelength in use.

In both of the embodiments shown in FIG. 6, the diameters of the concentric circles may be those which are set out in FIG. 5.

Bessel beams, however, are not useful for all desirable applications. For example, Bessel beams may not be suitable for applications such as bar code reading or the like. This is because of noise created in the signal by each of the beam's side lobes, which side lobes are created by light transmitted through each ring of the Bessel filter.

Therefore, in a further development of the concept, it may be desirable for some applications for the laser beam to be passed through a stop or aperture after it has passed the anamorphic element, but before it reaches the Bessel filter. Such an arrangement, an example of which will now be described with reference to FIGS. 7 to 9, means that it is not a full Gaussian beam but a truncated Gaussian which impinges upon the Bessel phase mask. When a truncated Gaussian beam is diffracted by the phase mask, the first order of diffraction is a Bessel-type beam, equivalent to the beam that would be generated by using a linear axicon. The zero-order beam in the diffraction is essentially the remanent original illumination excluding the first order beam and that one follows the law of truncated Gaussian beam propagation. The two beams, namely the Bessel-type beam and the remanent conventional Gaussian, effectively become two coherent components within a unified diffraction field. The beams are propagating along the same axis in the same direction. It is this combination that is referred to as a Bessel-Gaussian beam, in accordance with an embodiment of the present invention.

In accordance with an embodiment of the present invention, the width (or beam waist) of the truncated Gaussian beam is matched to the size of the Bessel phase mask. Thus, accounting for spreading, the truncated Gaussian beam is matched to the Bessel phase mask in such a manner that most of its energy impinges on the center circle of the phase mask. By thus matching the truncated Gaussian beam to the phase mask, noise from side lobes usually produced by the Bessel phase mask are avoided because of the strong central peak and weak side lobes of the resulting Bessel-Gaussian beam. Additionally, any edge effects (e.g., rippling effects) that create high spatial frequency noise, and are caused by truncation of the Gaussian beam, become negligible after passing through the Bessel phase mask.

Figure 7:
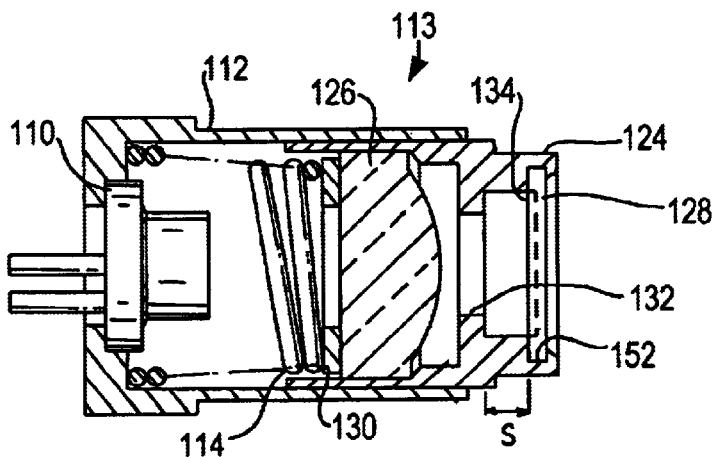
FIG. 7 shows an alternative embodiment of a beam generator.

The practical realization of this concept may be seen more specifically with reference to FIG. 7, which illustrates a cross-section through a beam-generating module. The module includes a VLD 110, for example an NEC model NLD3220S or a Sony model SLD1133VS, contained within a generally cylindrical laser holder 112. At the far end of the holder is a Bessel beam generator generally indicated at 113, and incorporating an optics holder 124 within which is mounted an anamorphic collimation lens 126 and a Bessel phase mask 128. The spacing between the VLD 110 and the Bessel beam generator 113 is maintained by a compression spring 114 which bears upon a star washer 130 at the rear surface of the collimation lens 126.

Between the lens 126 and the DOE 128, the holder 124 extends radially inwardly to form an annular aperture or stop 132, of diameter approximately 3 mm. The spacings between forward edge of the aperture and the DOE etched surface 134 of the phase mask 128 is about 1 mm.

Figure 8:
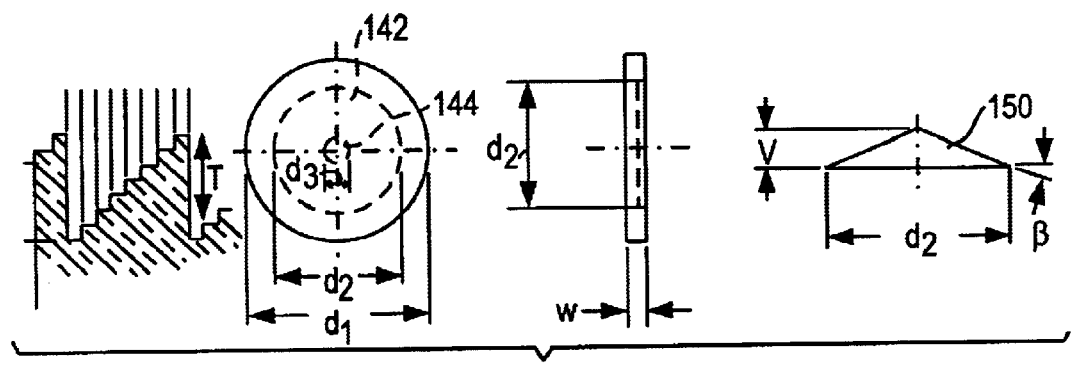
FIG. 8 shows details of the phase mask used in the FIG. 7 embodiment.
Figure 9:
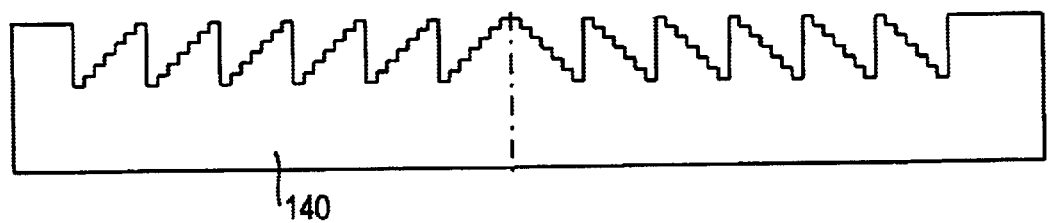
FIG. 9 is a cross-section through the phase mask used in the FIG. 7 embodiment.

Details of the preferred phase mask 128 are shown in FIGS. 8 and 9. As best seen in FIG. 9, the mask takes the form of a multi-level diffractive optical element 140, preferably of fused silica having a substrate with a refractive index of 1.455. As best seen in the two center drawings of FIG. 8, the mask consists of a circular flat disk having an overall diameter $d_1$ of 5 mm with an etched central area 142 having a diameter $d_2$ of 3.915 mm. At the very center, there is a flat central portion 144 of diameter $d_3$ of 75 $\mu$m. The thickness w of the plate is 0.58 mm.

Each annular ring of the plate has eight steps or eight phase levels, each of which has a width of 40 $\mu$m. The overall height t is equivalent to the laser wavelength of 650 nm.

The equivalent axicon cone 150 is shown on the right-hand side of FIG. 8. This has a diameter $d_2$, a height v of six times the laser wavelength, and an angle $\beta$ of 0.08°.

It will be understood that optical alignment is of some considerable importance. In the embodiment of FIGS. 7 to 9, the phase mask is aligned simply by dropping it into an appropriate annular space 152 in the holder 124.

In alternative embodiments, the phase mask may be manufactured from a square rather than from a round plate. Alignment methods for such a plate will now be described with reference to FIGS. 10 and 11.

Figures 11A, 11B, 11C:
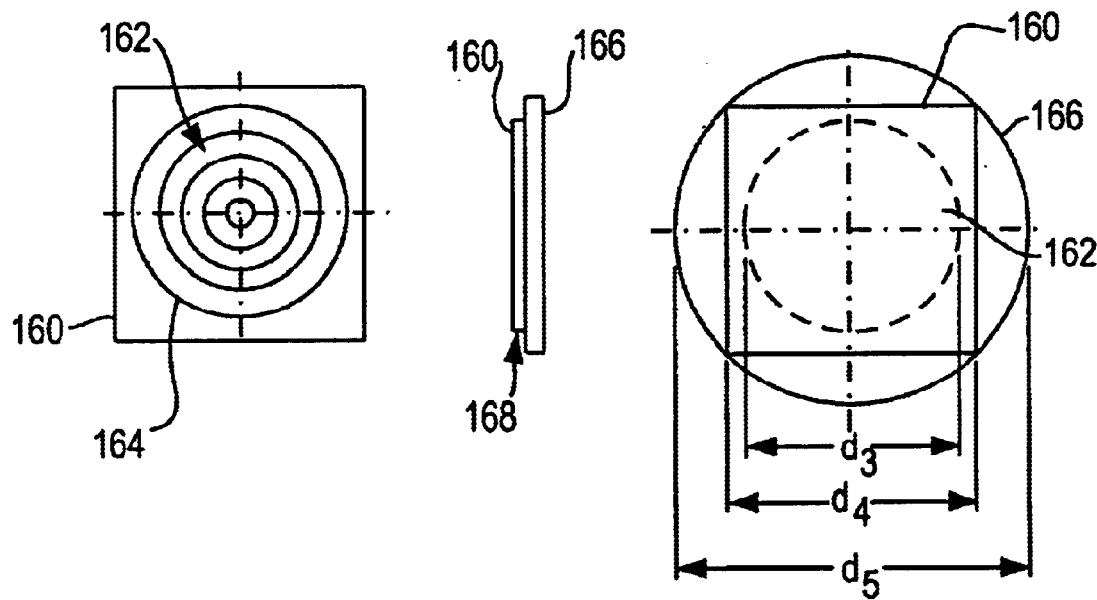
FIG. 11 shows details of the phase mask plate used in the embodiment of FIG. 10.

FIG. 11a illustrates a square plate 160 having a central circular active DOE area 162 etched onto it. A reference or alignment circle 164 is marked or etched onto the surface, around the DOE, this circle being used to assist in alignment during manufacture.

Figure 10:
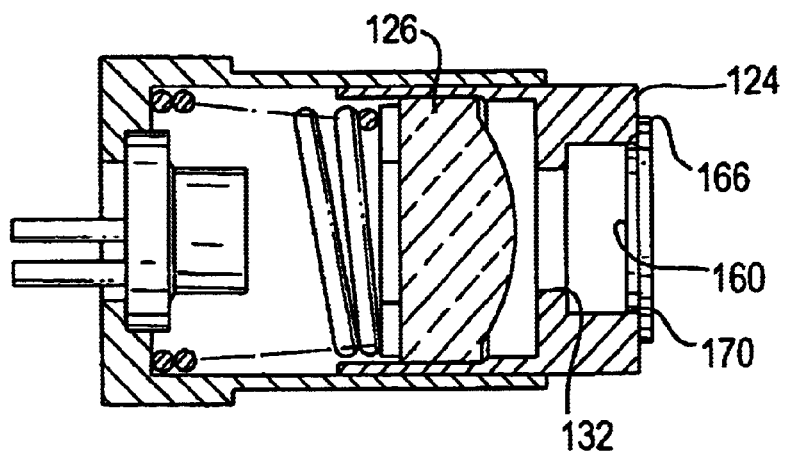
FIG. 10 shows an alternative practical embodiment of a beam generator.

An alterative approach is illustrated in FIGS. 11b and 11c. Here, the square plate 160 is mounted to a circular backing plate 166 by means of optically transparent adhesive. This forms a shoulder 168 (FIG. 11b) which is aligned with a corresponding shoulder 170 at the front of the holder 124 (FIG. 10). In the preferred embodiment the diameters $d_3$, $d_4$ and $d_5$ (see FIG. 11c) are respectively 3.95, 5.0 and 8.0 mm.

In operation, the Visual Laser Diodes shown in FIGS. 7 and 10 produce an asymmetric outgoing light beam which is first of all reshaped by the anamorphic lens 126 to make the beam symmetric. On the far side of the lens, the beam has a generally Gaussian configuration. As the beam passes through the aperture 132 the ends of the Gaussian curve are removed, and it is therefore a truncated Gaussian beam that impinges upon the Bessel filter. After passing through the Bessel filter, the outgoing beam effectively becomes the coherent combination of the non-diffracting (Bessel-type) and diffracting (conventional Gaussian) beam, or a Bessel-Gaussian beam. This beam permits a greater overall working range, in that at the far end it is dominated by the diffracting beam, and therefore overcomes the limitation of non-diffracting beams in decoding low density symbols far from the laser. At the near end of the working range, the beam is dominated by the non-diffracting beam, hence extending the working range for the decoding of high density bar code symbols at that near end.

The characteristics of Bessel-Gaussian beams will now be described in rather more detail, along with an alternative practical approach for designing the necessary filters. In this description, it will be assumed that the beam will be generated by two diffractive optical elements, the first correcting for the astigmatism of the original VLD source, as well as redistributing laser power, while the second provides the needed phase distribution.

The transverse amplitude distribution of a Gaussian beam having a waist w that propages along the z-axis has the form:

$$\psi_g(r, z) = A_z\exp(-ikz)\exp\left[-\frac{ikr^2}{2(iz_R - z)}\right] = A_z\exp(-ikz)\exp\left[-\frac{\pi r^2}{\lambda(l_R - iz)}\right] \quad (1)$$

where r is the radial distance from the z-axis, k is the wave number in the z-direction, $\lambda$ is the wavelength, $z_R$ is the Rayleigh distance, $A_z$ is a complex amplitude slowly varying along the z-axis, and z=0 is the waist location.

Figure 12:
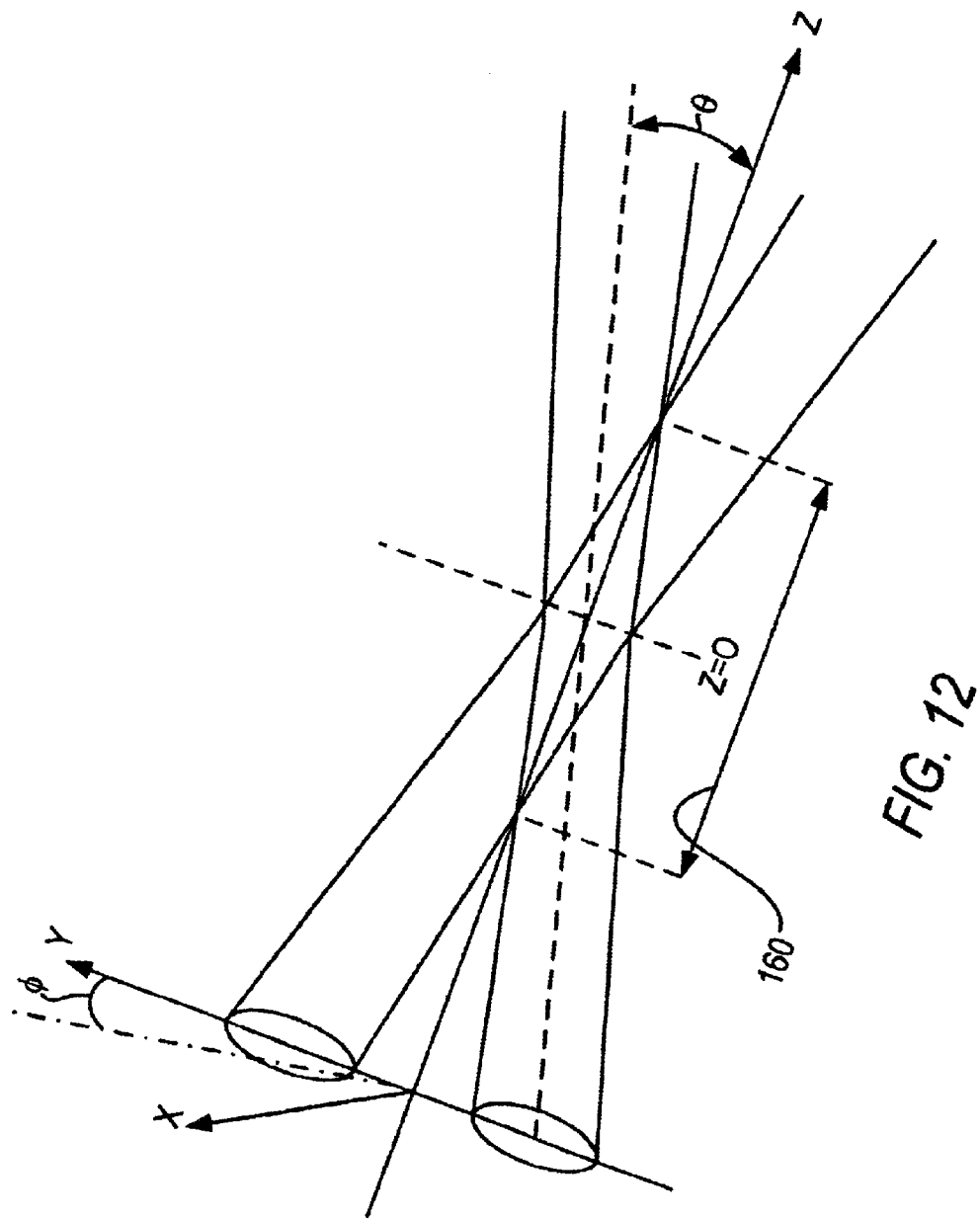
FIG. 12 is a graphical representation showing how a composite Bessel-Gaussian beam may be generated from a fan of identical Gaussian beams.

In order to create a Bessel-Gaussian beam we can consider, conceptually, a fan of Gaussian beams, oriented at a constant tilt angle θ with respect to the z-axis and intersecting at the z=0 plane (see FIG. 12). The amplitude distribution of the resulting composite beam can be written as:

$$\psi_c(\sigma, \zeta) = A_z \int_o^{2\pi} \exp\left[-ik\zeta - \frac{\pi\sigma^2}{\lambda(z_R - i\zeta)}\right]d\phi \quad (2)$$

To express this distribution in a common (x, y, z), or (r, z) coordinate system, we use the following coordinate transformations:

$$\zeta = r \sin θ \cos \phi + z \cos θ \quad (3)$$

$$\sigma^2 = r^2 + z^2 \sin^2 θ - r^2 \sin^2 θ \cos^2 \phi - zr \sin 2θ \cos\phi \quad (4)$$

Applying the paraxial approximations θ<<1 and r<<z, which are reasonable for practical implementations, the following expression is obtained.

$$\psi_c(r, z) \approx A_z\exp\left[-\frac{\pi r^2}{\lambda(z_R - iz)}\right]J_0\left[\frac{2\pi}{\lambda}rθ\frac{1 + i\frac{z}{z_R}}{1 + \frac{z^2}{z_R^2}}\right] \quad (5)$$

In equation 5, $J_0$ is the Bessel function of the first kind and zero order. Note that $z_R$ and θ are free parameters. The last expression (Equation 5) is a paraxial approximation, valid everywhere. Nevertheless, for scanning purposes the region of interest lies within the area where the beams forming the fan overlap (FIG. 12). The exact limits of the range of confinement (the working range 160) are determined by analyzing the composite beam characteristics as described below.

To understand the behavior of the Bessel-Gaussian beam, its modulation transfer functions (MTFs) at different z-distances are evaluated. The MTF is the normalized Fourier Transform of the signal obtained when the Bessel-Gaussian beam transverses a grating normal to the z-axis. If x is the direction of scanning of the beam, then MTF is given by:

$$MTF = \frac{F_x \int I(x, y)dy}{\int\int I(x, y)dxdy} \quad (6)$$

In equation 6, $F_x$ is the Fourier transform in the x-direction, and l(x,y) is the intensity distribution in the cross-section of a scanning beam.

Figure 13:
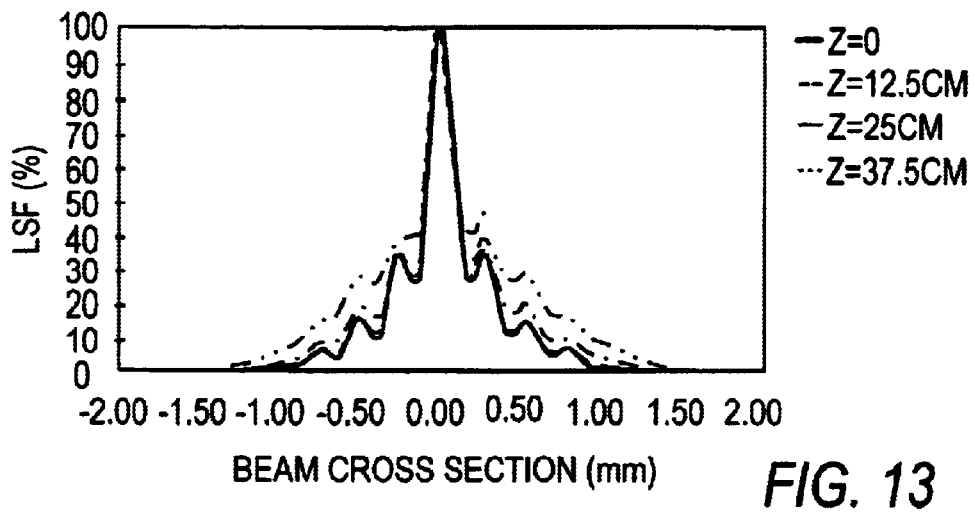
FIG. 13 shows typical line-spread functions of the preferred Bessel-Gaussian beam.
Figure 14:
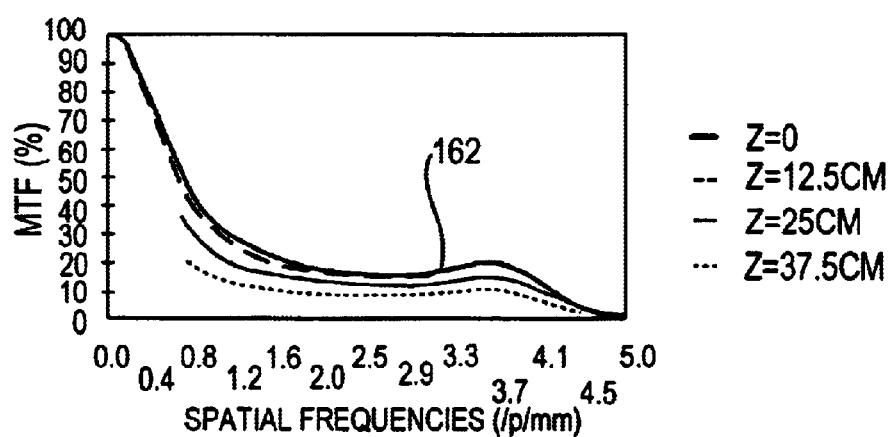
FIG. 14 shows the modulation transfer functions of the preferred Bessel-Gaussian beam.
Figure 15:
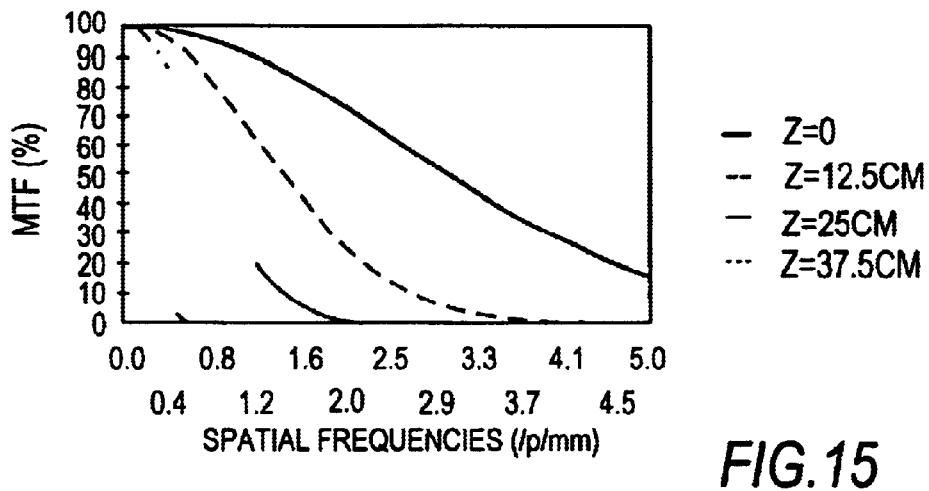
FIG. 15 shows the modulation transfer functions of a corresponding Gaussian beam at various distances from the waist.

FIG. 13 depicts the line spread functions (LSFS) of the Bessel-Gaussian beam, and FIG. 14 depicts its MTFS. [The LSF, as is well known to the skilled man, represents the system's response in the spatial domain to a delta-function input; the MTF represents the magnitude of the complex function which is the Fourier transform of the LSF.] This beam is designed specifically to resolve a spatial frequency of 4 lp/mm (line pairs per millimeter), corresponding to a 5 mil barcode structure, with a minimum contrast level of 10%. The MTFs are evaluated at different distances along the optical axis, measured from the waist (z=0) of the composite beam. FIG. 15 outlines the MTFs of a conventional Gaussian beam evaluated under the same conditions. Unlike the MTFs of the Gaussian beam, the MTFs of the Bessel-Gaussian beam are characterized by an "plateau" region 162 over a wide range of frequencies (FIG. 14). The extent of the plateau changes very little with the z-distance, a fact that is responsible for the extended "depth of focus" or working range of such beams. In contrast, the Gaussian beam has excellent contrast, but its MTFs drop off rapidly as the distance is increased (FIG. 15).

The range of a Gaussian beam is given by:

$$Rg = 2z_R = \frac{Z}{\pi\lambda f^2}\log\left(\frac{1}{c}\right) \quad (7)$$

where $f$ is the spatial frequency, and C is the minimum contrast (correspondingly the minimum MTF).

Figure 16:
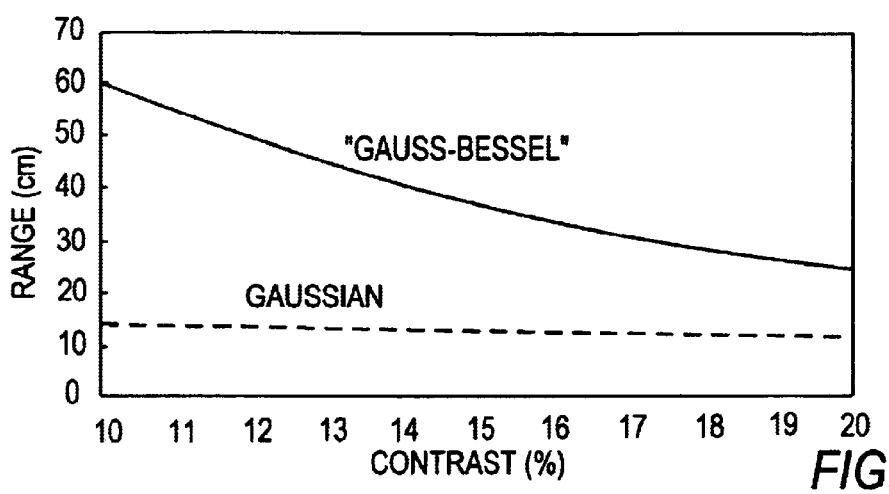
FIG. 16 illustrates the ranges of the Bessel-Gaussian beam, and a corresponding Gaussian beam, both optimized to resolve a grating space of four line pairs per millimeter.
Figure 17:
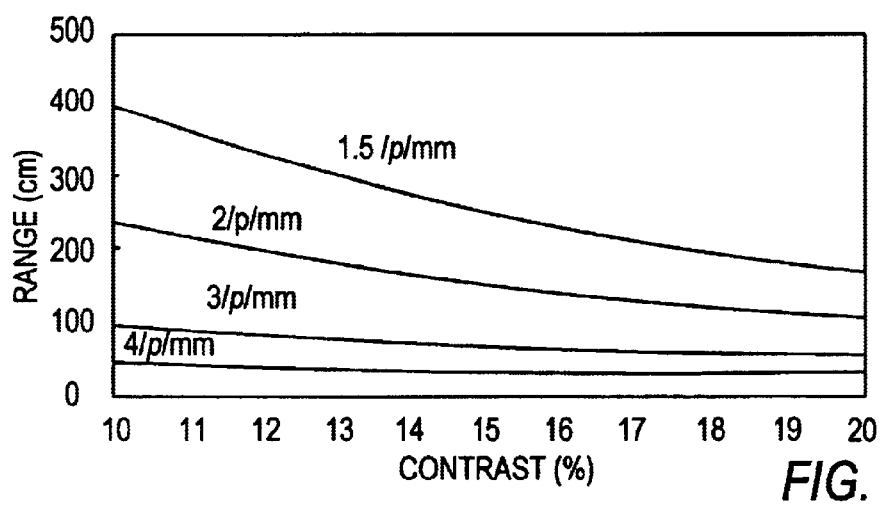
FIG. 17 illustrates the ranges of the Bessel-Gaussian beams optimized to resolve different maximum spatial frequencies.
Figure 18:
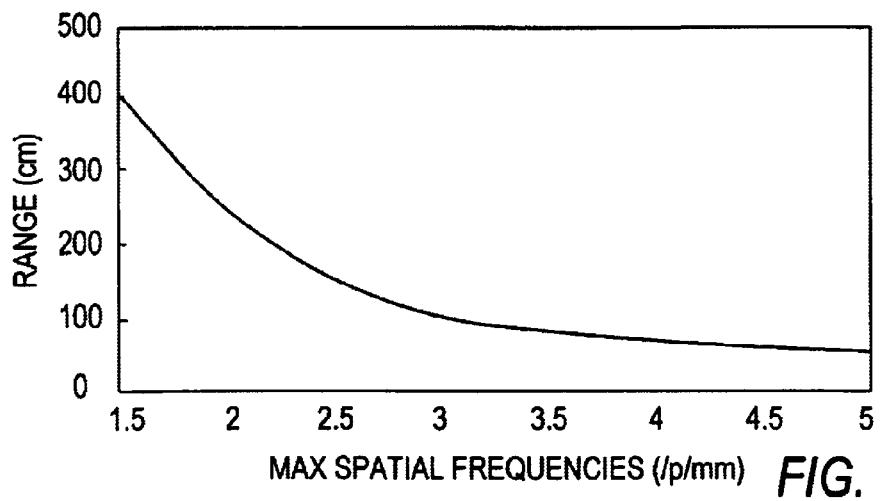
FIG. 18 shows the ranges of Bessel-Gaussian beams optimized for varying maximum spatial frequencies for operation at 10% contrast.

Results of the performance analyses are shown in FIGS. 16 to 18. FIG. 16 displays the range of confinement as a function of the detectable contrast for a Bessel-Gaussian and a Gaussian beam for scanning targets having spatial frequencies up to 4 lp/mm. FIG. 17 provides the ranges obtainable for Bessel-Gaussian beam optimized for various spatial frequencies. Finally, FIG. 18 depicts the ranges as a function of the target spatial frequencies for Bessel-Gaussian beams designed to provide signals having a minimum 10% contrast.

In order to generate the composite Bessel-Gaussian beam from the beam emitted from a visible laser diode, a pair of DOE filters is preferably used. In the preferred embodiment, phase only rather than amplitude/phase filters are used, in order to maximize light efficiency. As previously described, the first DOE corrects for the astigmatism as well as redistributing the laser power; the second DOE provides the needed phase distribution. The two filters, in tandem, generate the composite beam of the approximate form set out in equation 5.

Figure 19:
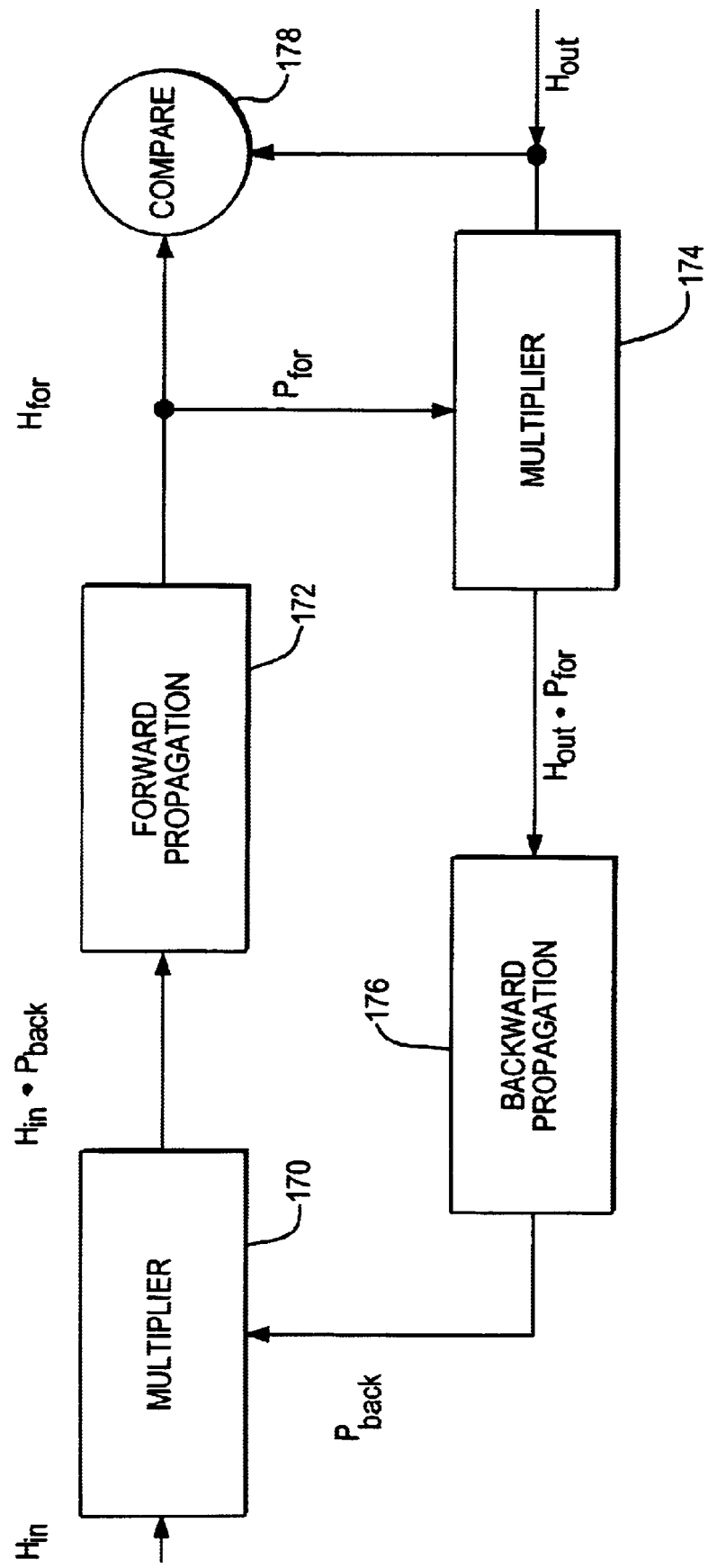
FIG. 19 illustrates a preferred method of producing a diffractive optical element to generate a Bessel-Gaussian beam, using the Gerchberg-Saxton algorithm.

In order to derive the filters, the Gerchberg-Saxton algorithm may be used: see: R. W. Gerchberg and W. O. Saxton, "A practical algorithm for the determination of phase for image and diffraction plane pictures," Optik 35, 227246 (1972). This paper is incorporated herein by reference. The algorithm may be implemented by means of the practical numerical iterative process which is shown schematically in FIG. 19. In that Figure, reference boxes 170 and 174 represent multiplication of the input functions, 172 represents forward propagation algorithm, 176 backward propagation algorithm and 178 a comparison operation. The nomenclature is as follows:

$H_{in}$: amplitude distribution of the collimated Gaussian beam $H_{out}$: desired amplitude distribution suitable for the Bessel-Gaussian beam $H_{for}$, $P_{for}$: Amplitude and phase distributions after the forward propagation between the phase elements $H_{back}$, $P_{back}$: amplitude and phase distributions after backward propagation between the phase elements.

The intensity distribution impinging on the first filter is the collimated laser input. The intensity after the second filter is the desired output, as prescribed by the requirements of the composite beam definitions. The iterative algorithm shown in FIG. 19 includes the effects of the free space propagation between the two filters. The resultant physical filter retains only the phase part of the complex field distribution arising from use of the method.

The actual DOEs are readily manufactured by standard multi-level DOE techniques, using standard lithography and reactive ion etching.

The Bessel-Gaussian beam thus synthesized from the two DOE phase-only filters provides an extended confinement range, obtained at the expense of a slightly reduced contrast for a wide range of spatial frequencies. Substantial improvements in the range of the beam can be achieved, depending on the optimized spatial frequency and the desired contrast level.

The embodiments previously described may be incorporated into any suitable housing, and in particular may be used in hand-held or fixed bar code readers or other optical indicia readers.

Figure 20:
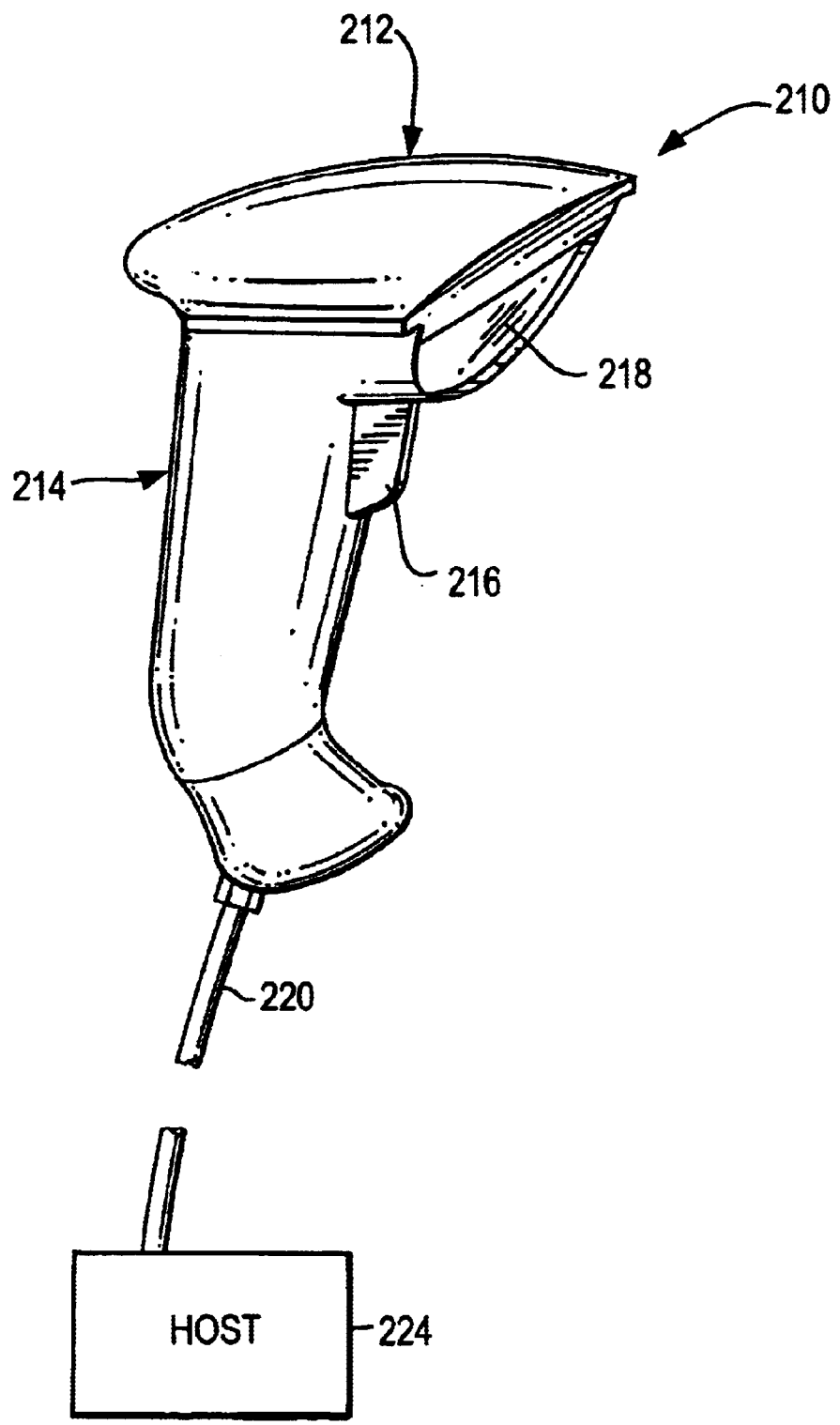
FIG. 20 is a perspective view of a hand-held optical scanner, suitable for use with the embodiments of the present invention; and, FIG. 21 is a perspective view of a hand-held data-entry/scanning terminal, suitable for use with the embodiments of the present invention.

FIG. 20 shows an exemplary hand-held optical scanner for use with the embodiments previously described. As shown in FIG. 20 reference numeral 210 generally identifies a hand-held scanner having a head 212 and an ergonomically-shaped handle 214. A manually-operable trigger 216 is situated below the head 212 on an upper, forwardly-facing part of the handle 214. A light source component typically but not necessarily a laser, is mounted inside the head 212. The light source emits a light beam along a transmission path which extends outwardly through a window 218 that faces indicia, e.g. bar code symbols, to be read. Also mounted within the head is a photodetector component, e.g. a photodiode, having a field of view, and operative for collecting reflected light returning through the window 218 along a path from the symbol.

A scanner component (to be described in more detail with reference to FIG. 21) is mounted within the head 212, and is operative for scanning the symbol and/or the field of view of the photodetector. The scanner component includes at least one light reflector positioned in the transmission path and/or the return path. The reflector is driven in oscillatory fashion by an electrically operated drive, preferably at the resonant frequency of the scanner component, thereby producing a scanning light beam.

The photodetector generates an electrical analog signal indicative of the variable intensity of the reflected light. This analog signal is converted into a digital signal by an analog-to-digital converter circuit. This digital signal is conducted to a decode module (not shown) within the scanner. The decode module decodes the digital signal into data descriptive of the symbol and the data are passed out along an external cable 220 to an external host device 224, normally a host computer. Here the data are stored for further processing. Instead of the cable 220, the scanner 210 and the external host device 224 may be in communication by a wireless connection, e.g., a radio link.

In operation, each time a user wishes to have a symbol read, the user aims the head at the symbol and pulls the trigger 216 to initiate reading of the symbol. The trigger 216 is an electrical switch that actuates the drive means. The symbol is repetitively and rapidly scanner. As soon as the symbol has been successfully decoded and read, the scanning action is automatically terminated, thereby enabling the scanner to be directed to the next symbol to be read in its respective turn.

In addition, the head need not be a portable hand-held type, as fixedly mounted heads are also contemplated. Furthermore, scanners in accordance with the present invention may have manually operated triggers, or may alternatively be continuously operated by direct connection to an electrical source.

The oscillations need only last a second or so, since the multiple oscillations, rather than time, increase the probability of getting a successful decode for a symbol, even a poorly printed one. The resonating reflector has a predetermined, predictable, known, generally uniform, angular speed for increased system reliability.

Figure 21:
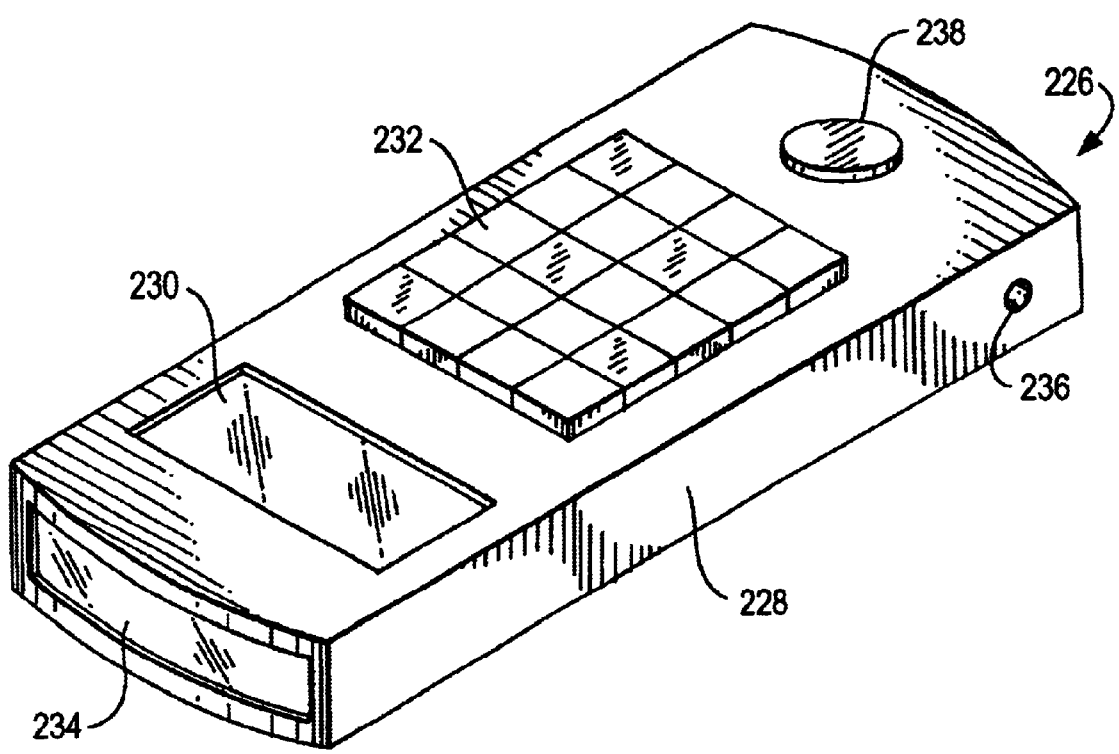

FIG. 21 shows an exemplary hand-held computer terminal, including an optical scanner for use with the embodiments previously described. Turning now to FIG. 21 there is shown an alternative hand-held optical scanner, this time taking the form of a scanning terminal 226. The terminal comprises a hand-held case 228 having a data display screen 230 and a data input keypad 232. A high speed scanning arrangement within the case 228 produces a scanning light beam which extends outwardly through a window 234 which faces the indicia to be read. Light reflected from the indicia passes back through the window 234 and impinges on a photodetector component (not shown), for example a photodiode, which creates a returning light output signal. The information content within that signal may be stored in an on-board memory (not shown) or may be downloaded to a remote computer via a data port 236. Alternatively, the information may be transmitted via a radio frequency signal produced by an on-board radio transmitter/receiver 238.

Without further analysis, the foregoing will so fully reveal the gist of the present invention that others can readily adapt to various applications without omitting features that, from the stand point of prior art, fairly constitute essential characteristics of the generic or specific aspects of the invention and, therefore, such adaptations should be and are intended to be compounded within the meaning and range of equivalence of the following claims.

What is claimed is:

1. In a scanner for electro-optically reading indicia located within a working range of distances relative to the scanner, a beam shaping system for extending the working range, the system comprising:

a) a laser for producing an asymmetric laser beam;
   b) a beam shaper for optically shaping the asymmetric laser beam to form an axially symmetric Gaussian beam;
   c) an aperture stop for truncating the symmetric Gaussian beam to form a truncated Gaussian beam having a cross-sectional area; and
   d) a Bessel filter for optically modifying the truncated Gaussian beam to form a composite Bessel-Gaussian beam having a non-diffracting Bessel beam component for reading indicia at near distances relative to the scanner within the working range, and a diffracting Gaussian beam component for reading indicia at far distances relative to the scanner within the working range, the Bessel filter having a central circular portion corresponding in area to the cross-sectional area of the truncated Gaussian beam.

2. The system of claim 1, wherein the laser is a laser diode for generating the asymmetric laser beam as a visible astigmatic laser beam having an elongated beam cross-section.

3. The system of claim 1, wherein the beam shaper is a diffractive optical element.

4. The system of claim 1, wherein the beam shaper is an anamorphic lens.

5. The system of claim 1, wherein the aperture stop is located between the beam shaper and the Bessel filter.

6. The system of claim 1, wherein the Bessel filter is a phase filter that modifies the truncated Gaussian beam according to the Bessel function.

7. The system of claim 1, wherein the Bessel filter is a multi-level diffractive optical element having a plurality of concentric rings surrounding a central circular portion.

8. The system of claim 1, wherein the Bessel filter is an etched substrate.

9. The system of claim 1, wherein the Bessel filter is a phase only filter.

10. The system of claim 1, wherein the Bessel filter is a phase and amplitude filter.

11. The system of claim 1, wherein the beam shaper and the Bessel filter are discrete spaced apart by an air gap.

12. The system of claim 1, wherein the beam shaper and the Bessel filter are integral in a one-piece construction.

13. In a method of electro-optically reading indicia located within a working range of distances relative to a scanner, a method of extending the working range, the method comprising the steps of:

a) producing an asymmetric laser beam;
   b) optically shaping the asymmetric laser beam to form an axially symmetric Gaussian beam;
   c) truncating the symmetric Gaussian beam to form a truncated Gaussian beam having a cross-sectional area;
   d) optically modifying the truncated Gaussian beam with a Bessel filter to form a composite Bessel-Gaussian beam having a non-diffracting Bessel beam component for reading indicia at near distances relative to the scanner within the working range, and a diffracting Gaussian beam component for reading indicia at far distances relative to the scanner within the working range; and
   e) matching the cross-sectional area of the truncated Gaussian beam to a central circular portion of the Bessel filter.

* * * * *